United States Patent Office 3,253,215
Patented May 24, 1966

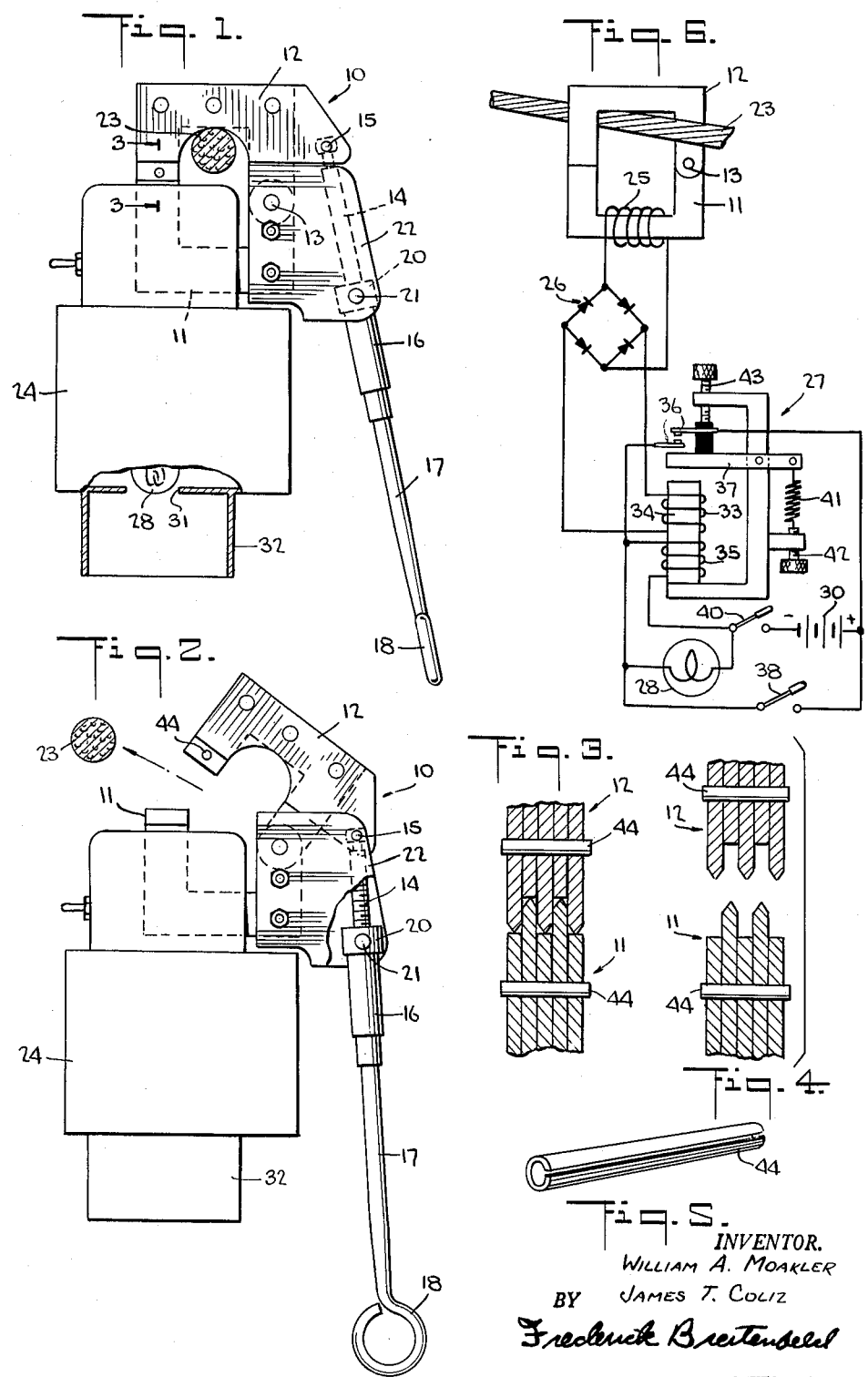

3,253,215
OVERLOAD CURRENT DETECTING DEVICE HAVING LAMINATED SPLIT CORE MEANS COUPLED TO A HOLDING CIRCUIT WITH INDICATOR
William A. Moakler, Bergenfield, and James T. Coliz, New Providence, N.J., assignors to Automatic Switch Co., Florham Park, N.J., a corporation of New York
Filed Sept. 30, 1959, Ser. No. 843,513
2 Claims. (Cl. 324—51)

This invention relates generally to electrical instruments, and has particular reference to a device for detecting faults in overhead transmission lines carrying alternating current.

It is a general object to provide a readily portable instrument of rugged structural character, relatively simple and economical from a manufacturing standpoint, which can be reliably used and reused as an accessory device in the determination of overload currents in outdoor conductors.

High voltage transmission lines of considerable length are often subjected to short circuits or other circuit defects due to lightning, switching surges, and temporary short circuiting events which are produced by foreign materials applied between two high voltage conductors or between one of the conductors and a ground line. Such disturbances usually cause a circuit breaker to open the transmission system and it is then necessary for an operator to determine the cause of the defect and find out the place where the disturbance occurred so that repairs may be made in the shortest possible time. A complete investigation of a long transmission line having a short circuit somewhere along its length is exceedingly difficult because of the high voltages involved and because current cannot be applied to a short-circuited line for any length of time without seriously injuring station equipment and transformers.

This invention permits a single operator to make tests along a high voltage transmission line at a large number of separated points, but the current which operates the testing equipment is applied for only a very short time interval which may be less than five seconds. The testing equipment involved introduces no danger to the operator since the equipment is intended to be preliminarily secured to the transmission line while no current is flowing, and the indication of excessive current is viewed from the ground without personal contact with the apparatus or the transmission conductor. More particularly, the device is adapted to be hung upon the transmission line being tested, and to energize a signal lamp (visible from beneath) when current is momentarily directed through the line, the circuitry being inductively actuated and including a holding circuit to keep the signal lamp in operation after the current in the line has been discontinued.

One of the objects of this invention is to provide an improved fault detector for high voltage transmission lines which avoids many of the disadvantages and limitations of prior art arrangements.

Another object of the invention is to simplify the detection of excessive currents flowing in transmission lines.

Another object of the invention is to reduce the danger generally associated with testing high voltage transmission lines.

Another object of the invention is to permit a single operator to test numerous points on a transmission line at widely separated points by means of only a single short current impulse in the line.

Another object of the invention is to provide a fault detector which may be adjusted to show the existence of current pulses having a wide range of current values.

The invention comprises a current transformer having a core which is formed of separable sections that can be clamped around the transmission conductor and insure a low reluctance magnetic path. The secondary winding of the transformer is connected through a rectifier to one coil of a relay. The relay includes a second coil which is connected in series with a battery, an indicating lamp, and a pair of locking contacts. The signal lamp is carried by the core in such a position that it may be observed from the ground.

One feature of the invention includes a plurality of ferromagnetic core laminations which are preset to insure reliable low reluctance whenever the clamp is closed. Another feature of the invention includes manually operated mechanical means for adjusting the air gap between the relay armature and the relay core so that the relay can be caused to be actuated by predetermined values of current.

For a better understanding of the present invention, together with other and further objects thereof, reference is made to the following description taken in connection with the accompanying drawings.

FIG. 1 is a side view of the fault detector shown in its closed position on a transmission conductor with parts of the outer housing broken away to show the signal lamp;

FIG. 2 is a side view of the fault detector showing the clamp in its open position;

FIG. 3 is an enlarged and exaggerated cross-sectional view of one portion of the current transformer core, taken along line 3—3 of FIG. 1;

FIG. 4 is a cross-sectional view similar to FIG. 3 but showing the core sections separated;

FIG. 5 is a perspective view of a friction pin used to hold the core laminations together; and FIG. 6 is a circuit diagram showing all the circuit elements of the fault detector together with some mechanical details of the locking relay.

Referring now to FIGS. 1 and 2, the fault detector shown includes a core 10 having a relatively stationary section 11 and a pivoted section 12 which can be rocked on a pivot 13. Means for opening and closing the core in jaw-like manner are provided by a screw threaded element 14 which is pivotally secured at one end 15 to the movable core portion 12. A long nut 16 engages the screw 14 and is turned by a handle 17 having an eyelet portion 18 for manipulation by hand or by a specially constructed hook which may be secured to the end of a long pole and operated from the ground. The nut 16 swivels in a collar 20 which is pivoted on a short shaft 21 secured to a bracket 22 which is bolted to the stationary portion 11 of the core.

When the fault detector is to be connected to an overhead high voltage transmission line 23, the core is opened by turning handle 17 to the position shown in FIG. 2. The movable portion 12 of the core is hooked over the conductor 23 and handle 17 is turned until the core laminations are fully meshed, this position being shown in FIG. 1. The fault detector is now ready for operation. Installing the detector in the manner described above is done when the current has been turned off at the central station or elsewhere and there is no voltage existing between the conductor 23 and any other portion of the transmission line or ground.

The fault detector contains a housing 24 which includes within its confines (see FIG. 6) a transformer secondary winding 25, a rectifier 26, a relay 27, an indicating lamp 28, and a small battery 30. As shown in FIGS. 1 and 2 the signal lamp 28 is visible from beneath and may for example be set close to a small aperture 31 and shielded from ambient illumination by a short downwardly open housing or tube 32.

As will be seen from the circuitry of FIG. 6, the conductor 23 forms the primary of the current transformer and winding 25 forms the secondary winding. The secondary winding is connected to rectifier 26, which may for example be a four-element bridge-type rectifier as shown. The direct current line from the rectifier is connected to a first winding 33 on a core 34 of the relay 27. The relay core 34 also carries a holding winding 35 which is connected in parallel with the indicating lamp 28 and is in series with battery 30, a pair of contacts 36 controlled by a pivoted armature 37, and a switch 40. A second switch 38 is connected across the pair of contacts 36 for testing the lamp, battery, and relay operation just prior to the fault test.

The relay armature 37 is held in its open position by the usual spring means 41, the tension of which may be adjusted by a manually operated screw 42. This spring may be any one of the well-known types which resiliently stress the armature 37 toward open position. The armature is positioned by an adjusting screw 43 which may be manually adjusted to change the air gap between the armature 37 and the relay core 34. By the combined adjustment of screws 42 and 43 the relay may be set to operate at current values which may vary over a wide range of values.

When the operator installs the fault detector on the conductor 23, he first closes switch 40 to put the device into operation, then switch 38 is closed momentarily to make sure that lamp 28 has not been burned out, and that battery 30 still has sufficient power to operate the lamp 28 and the relay 27. The fault detector is then reset and made ready to put into operation by opening and then reclosing switch 40. Several of these fault detectors may be installed at various places along the transmission line and after all of them have been secured in place, power is applied to the transmission line by a central station operator or otherwise. The application of standard voltage is only temporary and produces a current pulse through the conductor which may be considerably above the usual current value, thereby indicating a short-circuit, or maybe zero, indicating that the fault detector is beyond the position where the short-circuit is occurring.

If there is no current in the conductor or if the current is below a predetermined maximum value the current through winding 33 will be less than the current which actuates the relay and the indicator lamp 28 will not be lighted. If the current is greater than the predetermined value, the current through winding 33 will attract armature 37 and close contacts 36, thereby completing two parallel circuits. One is through battery 30, switch 40, and indicator lamp 28. The other is through battery 30, switch 40, and winding 35. This latter circuit is a holding circuit and produces enough magnetic flux in the relay core to maintain the armature 37 in its closed position and keep the lamp 28 lighted until switch 40 is opened.

The operator now looks at each fault detector and notes whether the detector lamp 28 is lighted. This information provides a good determination of the short circuit, and repair work may be started to remedy the defect. After the short circuit has been located, the fault detectors may be removed from conductor 23 by manipulation of handle 17 to spread the core sections 12 and 11. Switches 40 are all opened to extinguish the lamps 28 and reduce the drain on the small cells 30. Collection of the fault detectors may be done even with the high voltage in the transmission line since the detectors are placed on and removed from the line by means of a protective "hot stick" or "hot line clamp stick."

It will be evident from the above description that the current through winding 33 must be accurately determined to produce good results, and this current is a function of the magnetic coupling between winding 25 and conductor 23. The turns ratio will produce the predetermined voltage across winding 33 only if the core components 11 and 12 form a closed magnetic path of low reluctance. One method of insuring an efficient bond between the laminations on the two parts of the core 10 is to stagger the lamination ends as indicated in FIGS. 3 and 4 and to bond these ends together by means of a resilient friction pin 44. This type of pin is well-known and may consist, for example, of a stainless steel sleeve having a longitudinal slot running the entire length of the pin (FIG. 5). The pins are force fitted into holes formed in the core laminations of sections 12 and 11 and, because of their resiliency, retain the laminations in their set position. When the fault detector is first assembled, the core components 12 and 11 are forced together and this operation spreads the laminations to a position where the end pieces are in close rubbing position. After this preliminary operation, no further adjustment is necessary since the pins 44 frictionally hold the laminations in their set position and insure that a good magnetic junction will be attained each time the laminations are brought into closed contact.

The foregoing disclosure and drawings are merely illustrative of the principles of this invention and are not to be interpreted in a limiting sense. The only limitations are to be determined by the scope of the appended claims.

What is claimed is:

1. A fault detector for determining overload currents in an overhead A.C. transmission line, comprising a ferromagnetic core adapted to be hung upon said line in enclosing relation thereto, an electrical signal carried by said core and visible from beneath it, an actuating circuit including a secondary winding on said core for energizing said signal when the current in the transmission line exceeds a predetermined value, and a holding circuit activated by said actuating circuit for locking said signal in energized condition whereby said signal remains energized even after the current in the transmission line has been discontinued, said core being split in a plane perpendicular to the plane in which the core lies to form two jaw-like sections which can be clamped around the overhead line, each of said sections being made up of a plurality of ferromagnetic laminations having a staggered interleaving extremity adapted to cooperate with the extremity of the other section when the two sections are closed, and a plurality of longitudinally split tubular pins forced into aligned holes in said laminations in order to frictionally hold said laminations together, whereby when the staggered extremities of said core sections are joined said laminations will spread to a position wherein there is close rubbing contact between the laminations of the two sections.

2. A fault detector according to claim 1 including a screw and nut combination for opening and closing said core sections.

References Cited by the Examiner
UNITED STATES PATENTS

| | | | |
|---|---|---|---|
| 584,463 | 6/1897 | Creelman | 317—155 |
| 946,487 | 1/1910 | Burlingame | 317—155 |
| 1,102,513 | 7/1914 | Johannesen | 336—217 |
| 1,569,723 | 1/1926 | Dickinson | 336—176 X |
| 1,830,541 | 11/1931 | Harris | 336—176 |
| 1,876,324 | 9/1932 | Borden | 324—62 |
| 2,013,241 | 9/1935 | Hefner | 340—253 |
| 2,113,737 | 4/1938 | McMaster | 317—155 |
| 2,120,447 | 6/1938 | Tipsord | 339—264 |
| 2,129,524 | 9/1938 | Camilli | 324—127 |
| 2,146,555 | 2/1939 | Arey | 324—127 |
| 2,176,756 | 10/1939 | Borden | 336—217 |
| 2,323,996 | 7/1943 | Hubbard | 324—127 |

(Other references on following page)

UNITED STATES PATENTS

| | | | |
|---|---|---|---|
| 2,375,591 | 5/1945 | Schweitzer | 324—127 |
| 2,467,867 | 4/1949 | Somerville | 336—217 X |
| 2,483,723 | 10/1949 | Burton | 317—155 |
| 2,565,303 | 8/1951 | Garbarino | 336—217 |
| 2,590,606 | 3/1952 | Golden | 317—155 |
| 2,595,820 | 5/1952 | Somerville | 336—217 X |
| 2,709,800 | 5/1955 | Temple et al. | 324—127 |
| 2,811,703 | 10/1957 | Becker | 339—109 |
| 2,814,795 | 11/1957 | Spooner | 317—155 |

WALTER L. CARLSON, *Primary Examiner.*

SAMUEL BERNSTEIN, LLOYD McCOLLUM, FREDERICK M. STRADER, *Examiners.*

GERALD R. STRECKER, J. P. O'BRIEN, G. S. KINDNESS, *Assistant Examiners.*